US011654859B2

(12) United States Patent
Schoenborn et al.

(10) Patent No.: US 11,654,859 B2
(45) Date of Patent: May 23, 2023

(54) FILTER DIFFUSER

(71) Applicant: ILLINOIS TOOL WORKS INC., Glenview, IL (US)

(72) Inventors: Randall Joseph Schoenborn, Allendale, MI (US); John David Bisset, Hudsonville, MI (US); David Aaron Prymula, Allegan, MI (US)

(73) Assignee: Illinois Tool Works Inc., Glenview, IL (US)

( * ) Notice: Subject to any disclaimer, the term of this patent is extended or adjusted under 35 U.S.C. 154(b) by 335 days.

(21) Appl. No.: 16/878,818

(22) Filed: May 20, 2020

(65) Prior Publication Data

US 2021/0009075 A1 Jan. 14, 2021

Related U.S. Application Data

(60) Provisional application No. 62/871,370, filed on Jul. 8, 2019.

(51) Int. Cl.
*B60R 21/262* (2011.01)
*B01D 46/00* (2022.01)
*B01D 46/24* (2006.01)
*B60R 21/217* (2011.01)

(52) U.S. Cl.
CPC ........ *B60R 21/262* (2013.01); *B01D 46/0039* (2013.01); *B01D 46/0047* (2013.01); *B01D 46/2403* (2013.01); *B01D 2279/10* (2013.01); *B60R 21/217* (2013.01)

(58) Field of Classification Search
CPC . B60R 21/262; B60R 21/217; B60R 21/3644; B60R 21/272; B60R 2021/2612; B60R 2021/2633; B60R 2021/2685; B01D 2279/10; B01D 46/0039; B01D 46/0047; B01D 46/2403; B01J 4/001; B01J 7/00; B01J 19/245; B01J 2219/00157
USPC ........................................................ 55/410
See application file for complete search history.

(56) References Cited

U.S. PATENT DOCUMENTS

2004/0026910 A1\* 2/2004 Englbrecht .............. B01J 4/001
280/736
2009/0085335 A1\* 4/2009 Yabuta .................. B60R 21/268
280/736

FOREIGN PATENT DOCUMENTS

| DE | 29702011 U1 | 6/1997 |
| DE | 19957578 A1 | 5/2001 |
| DE | 10033319 A1 | 1/2002 |
| DE | 10318133 A1 | 10/2003 |
| DE | 20215541 U1 | 2/2004 |
| DE | 10320104 A1 | 12/2004 |
| JP | H10264762 A | 10/1998 |

OTHER PUBLICATIONS

Office Action for corresponding German Patent Application No. 10 2020 115 988.9, dated Oct. 7, 2022 (15 pages).

\* cited by examiner

*Primary Examiner* — Robert A Hopkins
*Assistant Examiner* — Qianping He
(74) *Attorney, Agent, or Firm* — Quarles & Brady LLP

(57) ABSTRACT

A diffuser includes a first tube and a second tube. The first tube includes a key and defines a first opening. The second tube is inserted through the first opening. The second tube defines a notch. The key is inserted into the notch.

14 Claims, 6 Drawing Sheets

FILTER DIFFUSER

RELATED APPLICATIONS

The present application claims priority to U.S. Provisional Application Ser. No. 62/871,370 filed on Jul. 8, 2019, which is incorporated by reference in its entirety herein.

FIELD OF THE DISCLOSURE

Embodiments of the present disclosure generally relate to vehicle airbag components, and, more particularly, to a filter diffuser.

BACKGROUND

In recent years, diffusers have been developed to disperse a flow of gas into an airbag to inflate the airbag. For example, a diffuser may be connected to a reaction canister and an airbag. These diffusers fluidly connect the reaction canister to the air bag and aid in dispersing gases produced in the reaction canister throughout the airbag.

Certain known diffusers include an inflator tip configured to be disposed in the airbag. The inflator tip has a lengthwise axis and defines circumferential holes perpendicular to the axis to disperse gases produced in the reaction canister in a multitude of directions within the airbag.

However, these known diffusers do not direct gases in specific, predetermined directions within the airbag. Therefore, a need exists for a diffuser that directs gases in specific, predetermined directions within an airbag.

SUMMARY

In one aspect, an example diffuser includes a first tube and a second tube. The first tube includes a key and defines a first opening. The second tube is inserted through the first opening. The second tube defines a notch. The key is inserted into the notch.

In another aspect, an example diffuser includes a first tube and a second tube. The first tube defines a cavity. The second tube is inserted into the first tube. The second tube has a perforated portion disposed in the cavity. The second tube defines an outlet aligned with the first tube. The outlet is in fluid communication with the cavity via the perforated portion.

In another aspect, an example diffuser includes a first tube and a second tube. The first tube includes a bevel. The bevel defines an opening. The second tube extends through the opening and sealingly engages the bevel. The second tube has a perforated section disposed in the first tube.

Figure 1:
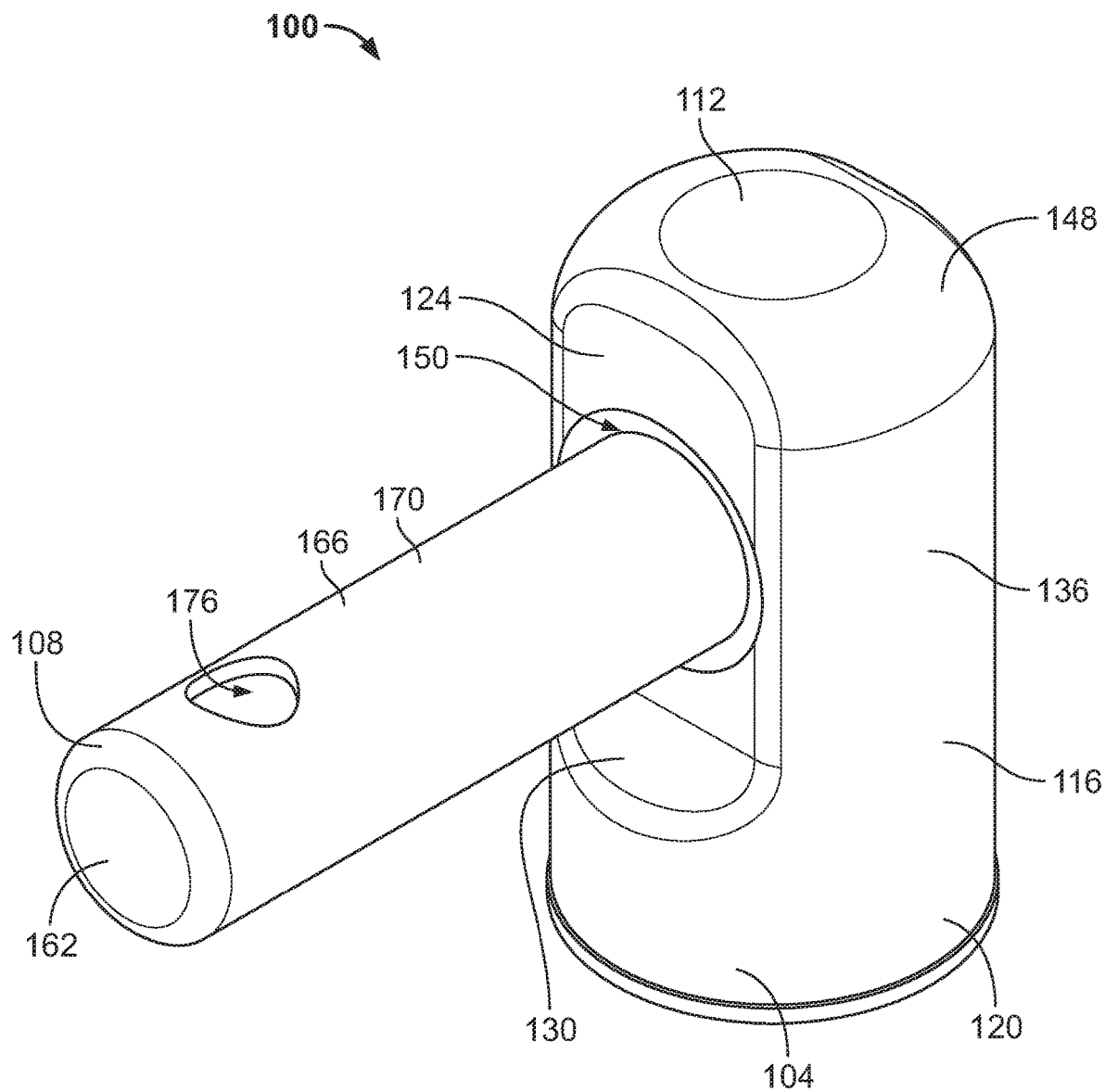
FIG. 1 is an isometric view of a first example diffuser according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a diffuser that directs a gas flow in specific, predetermined directions within an airbag and filters the gas flow upstream of the airbag.

A first example diffuser 100 according to an embodiment of the present disclosure is depicted in FIGS. 1-6. With reference to FIGS. 1-6, the first example diffuser 100 includes a first tube 104 and a second tube 108. The first tube 104 is engaged with the second tube 108. In some embodiments, the first tube 104 and/or the second tube 108 are metallic. In some embodiments, the first tube 104 and/or the second tube 108 are formed of a polymer. The first tube 104 and the second tube 108 may be formed of any suitable material.

Figure 2:
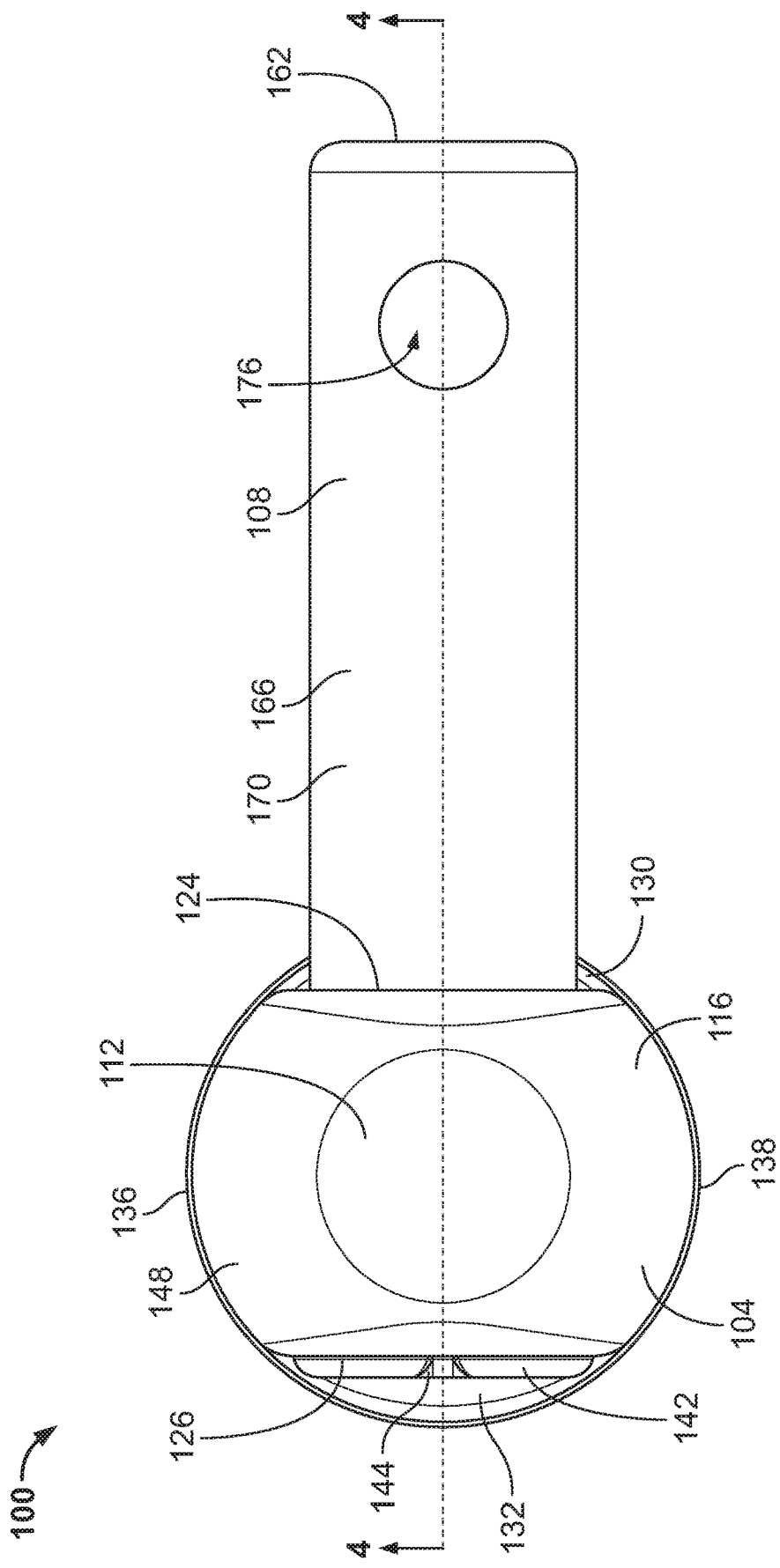
FIG. 2 is a top view of the first example diffuser of FIG. 1.
Figure 3:
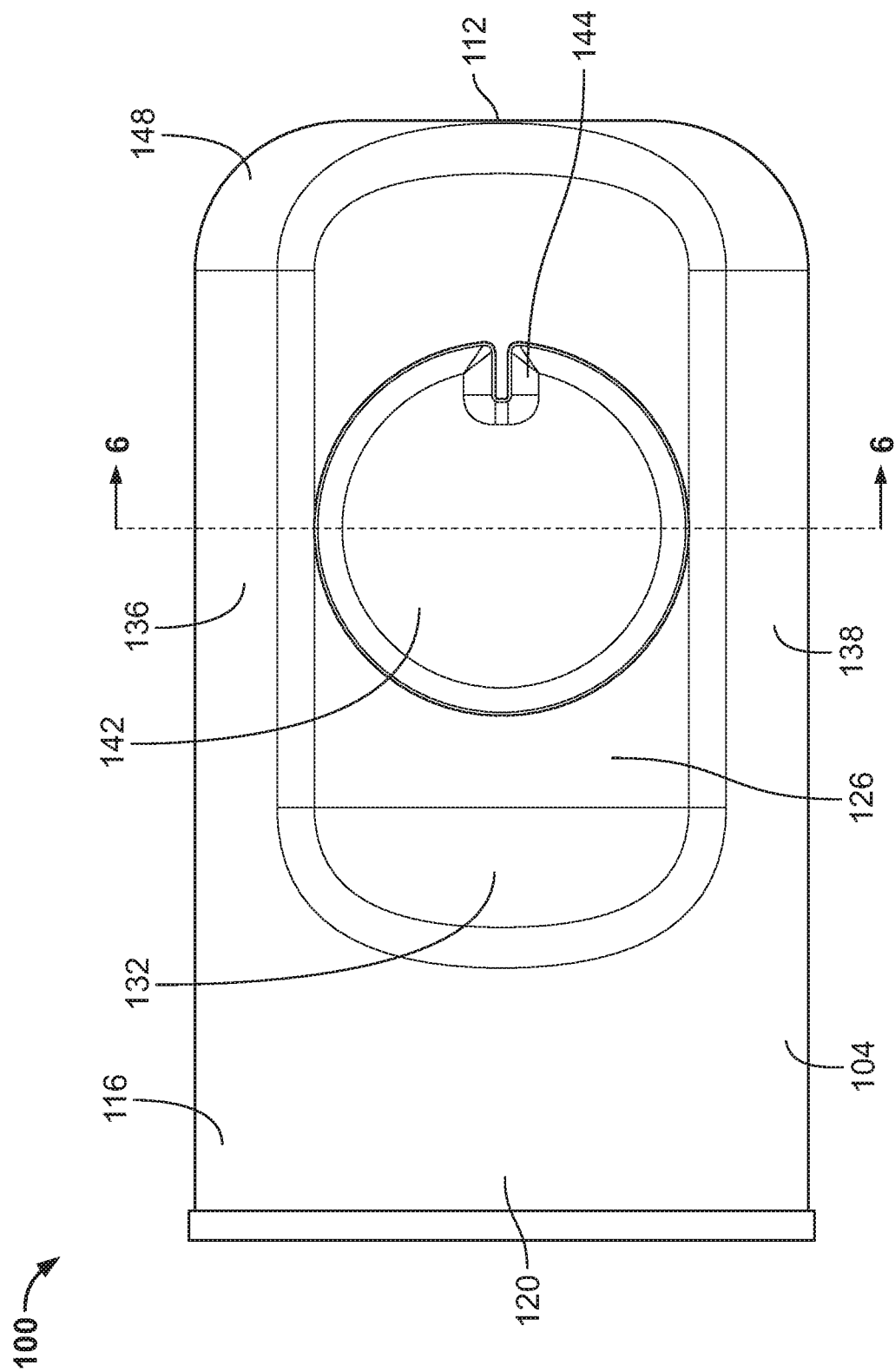
FIG. 3 is a side view of the first example diffuser of FIGS. 1 and 2.
Figure 4:
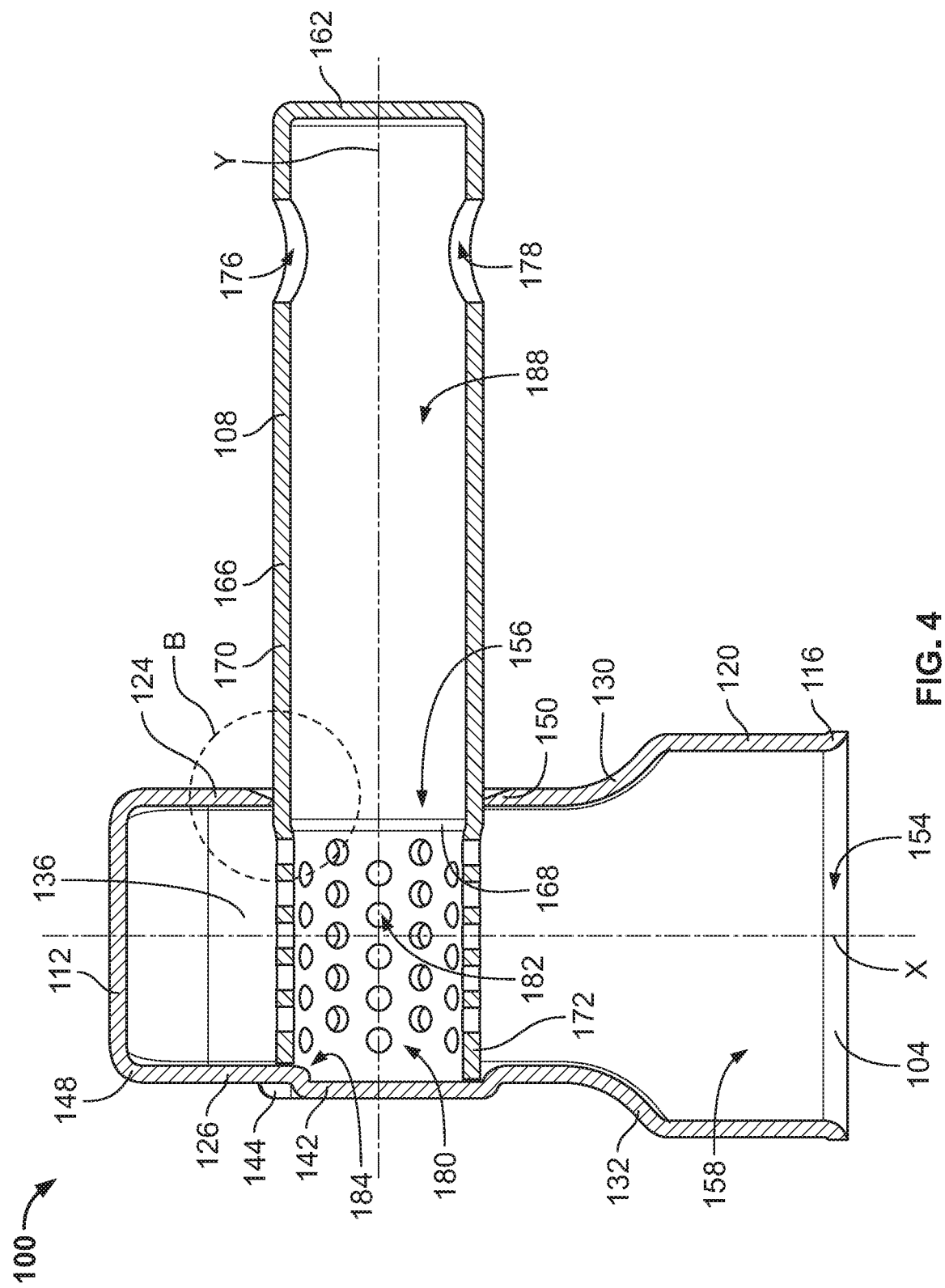
FIG. 4 is cross-sectional view of the first example diffuser of FIGS. 1-3 taken along line 4-4 of FIG. 2.
Figure 6:
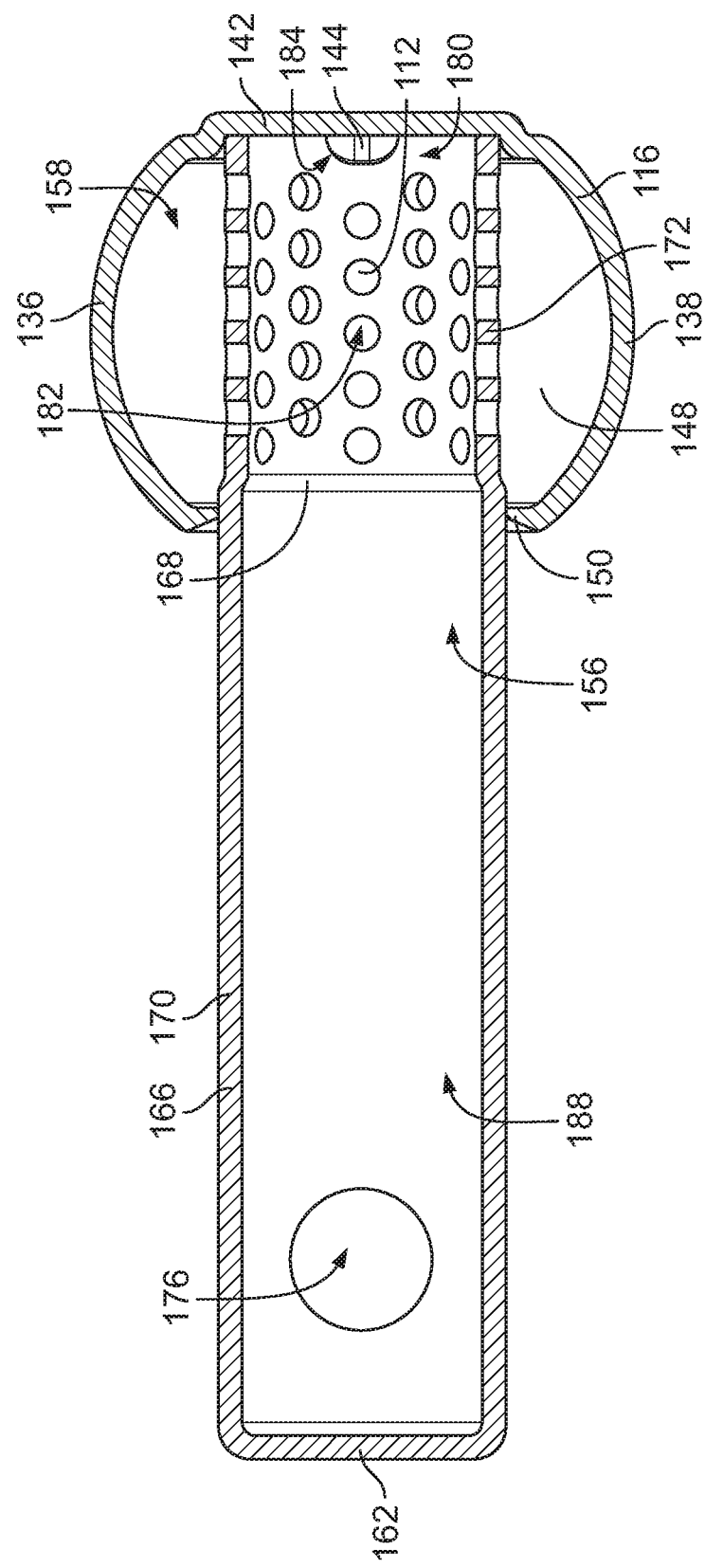
FIG. 6 is cross-sectional view of the first example diffuser of FIGS. 1-5 taken along line 6-6 of FIG. 3.

With reference to FIG. 1, the first tube 104 includes a first end wall 112 and a first perimeter wall 116. The first end wall 112 is connected to the first perimeter wall 116. With reference to FIG. 4, the first perimeter wall 116 includes a first cylindrical portion 120, a first flat portion 124, a second flat portion 126, a first ramp portion 130, and a second ramp portion 132. The first cylindrical portion 120 is connected to the first ramp portion 130 and the second ramp portion 132. The first flat portion 124 is opposite the second flat portion 126. The first flat portion 124 is connected to the first ramp portion 130. The second flat portion 126 is connected to the second ramp portion 132. With reference to FIG. 6, the first perimeter wall 116 also includes a first curved portion 136, a second curved portion 138, a receiver portion 142, and a key 144. With reference to FIG. 2, the first curved portion 136 and the second curved portion 138 are opposite one another. The first curved portion 136 and the second curved portion 138 are connected to the first flat portion 124. The first curved portion 136 and the second curved portion 138 are also connected to the second flat portion 126. The receiver portion 142 is generally circular. The receiver portion 142 is connected to and extends outwardly from the second flat portion 126. The key 144 is noncircular (e.g., square, rectangular, polygonal, etc.) and is connected to the receiver portion 142 and to the second flat portion 126. With reference to FIG. 1, the first perimeter wall 116 also includes a first transition region 148 and a bevel 150. The first end wall 112 is connected to the first transition region 148. With reference to FIG. 4, the bevel 150 is opposite the receiver portion 142 and is connected to the first flat portion 124. With reference to FIG. 4, the first cylindrical portion 120 defines a first inlet 154. With reference to FIGS. 4 and 6, the bevel 150 defines a first opening 156. The first inlet 154 is in fluid communication with the first opening 156. The first tube 104 defines a first cavity 158. With reference to FIG. 4, the first opening 156 is perpendicular relative to a longitudinal axis X of the first tube 104.

With reference to FIG. 1, the second tube 108 includes a second end wall 162 and a second perimeter wall 166. The second end wall 162 is connected to the second perimeter wall 166. With reference to FIG. 4, the second perimeter wall 166 includes a second transition region 168, a second cylindrical portion 170, and a third cylindrical portion 172. The second transition region 168 is connected to and provides a partially conical tapered transition between the second cylindrical portion 170 and the third cylindrical portion 172. The second cylindrical portion 170 is greater in diameter than the third cylindrical portion 172. The second cylindrical portion 170 defines a first outlet 176 and a second outlet 178. In some embodiments, the first outlet 176 and the second outlet 178 are aligned with the longitudinal axis X In some embodiments, the first outlet 176 and the second outlet 178 are misaligned relative to the longitudinal axis X. With reference to FIG. 6, the third cylindrical portion 172 defines a second opening 180, a plurality of perforations 182, and a notch 184. Thus, the third cylindrical portion 172 is perforated. The second opening 180 is in fluid communication with the plurality of perforations 182. The second tube defines a second cavity 188. With reference to FIG. 4, in some embodiments, the first outlet 176 is opposite the second outlet 178. The first outlet 176, the second outlet 178, and each perforation 182 of the plurality of perforations 182 are perpendicular relative to a longitudinal axis Y of the second tube 108.

Figure 5:
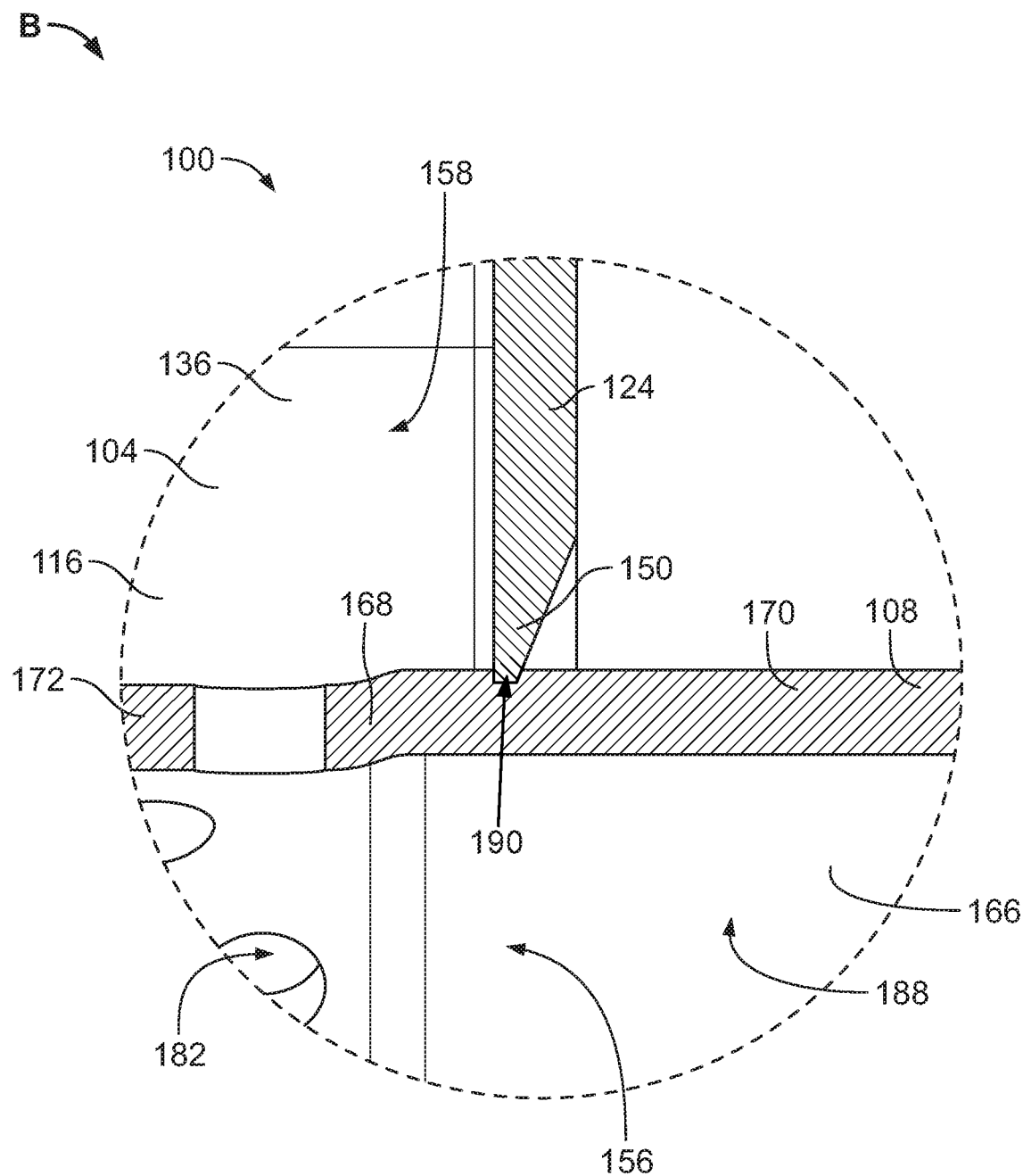
FIG. 5 is an enlarged cross-sectional view of the first example diffuser of FIGS. 1-4 taken from section B of FIG. 4.

With reference to FIGS. 4-6, the second tube 108 is inserted into the first tube 104 through the first opening 156. In some embodiments, the bevel 150 tightly and sealingly engages the second cylindrical portion 170 via a press fit. In other words, before assembly of the second tube 108 into the first tube 104, an outer diameter of the second cylindrical portion 170 is greater than an inner diameter of the bevel 150 (not shown). The bevel 150 and the second transition region 168 act as lead-in features to facilitate insertion of the second tube 108 into the first tube 104. With reference to FIG. 5, in some embodiments, the second tube 108 defines a groove 190 to snapably receive the bevel 150. Thus, the second tube 108 securely snapably engages with the first tube 104.

With reference to FIGS. 4 and 6, the key 144 is inserted into the notch 184 to engage the third cylindrical portion 172. With reference to FIG. 4, insertion of the key 144 into the notch 184 prevents rotation of the second tube 108 relative to the first tube 104 in the first opening 156 about the axis Y. With reference to FIGS. 4 and 6, the third cylindrical portion 172 is seated in the receiver portion 142. Insertion of the third cylindrical portion 172 into the receiver portion 142 prevents pivoting of the second tube 108 relative to the first tube 104. Thus, with reference to FIG. 4, the first outlet 176 and the second outlet 178 are positionally fixed relative to the first tube 104. In the example of FIGS. 4 and 6, the first tube 104 and the second tube 108 are generally perpendicular. In some embodiments, the receiver portion 142 and the key 144 are offset from the first opening and the first tube 104 and the second tube 108 are arranged non-perpendicularly to one another.

With reference to FIGS. 4-6, the third cylindrical portion 172 and the second transition region 168 are disposed in the first cavity 158. The plurality of perforations 182 are in fluid communication with the first cavity 158 and the second cavity 188. With reference to FIG. 4, the first outlet 176 and the second outlet 178 are in fluid communication with the second cavity 188. The first cavity 158 is in fluid communication with the first inlet 154. Thus, the first outlet 176 and the second outlet 178 are in fluid communication with the first inlet 154 via the first cavity 158, the plurality of perforations 182, and the second cavity 188.

With reference to FIGS. 4 and 6, in operation, the first outlet 176 and the second outlet 178 are downstream of the second cavity 188. In operation, the second cavity 188 is downstream of the plurality of perforations 182. In operation, the plurality of perforations 182 is downstream of the first cavity 158. In operation the first cavity 158 is downstream of the first inlet 154.

With reference to FIGS. 4 and 6, conversely, in operation, the first inlet 154 is upstream of the first cavity 158. In operation, the first cavity 158 is upstream of the plurality of perforations 182. In operation, the plurality of perforations 182 are upstream of the second cavity 188. In operation, the second cavity 188 is upstream of the first outlet 176 and of the second outlet 178.

With reference to FIGS. 1, 3, 4 and 6, the first cylindrical portion 120 is configured to sealingly engage with a reaction canister (not shown). When the reaction canister produces a flow of gas, the flow enters the diffuser 100 via the first inlet 154. Each perforation 182 of the plurality of perforations 182 is sized to block particulate matter (not shown) entrained with the flow of gas from reaching the second cavity 188. Thus, the particulate matter remains in the first cavity 158. In other words, the third cylindrical portion 172 filters the flow of gas from the reaction canister upstream of the second cavity 188.

With reference to FIGS. 1, 4, and 6, the second cylindrical portion 170 is configured to sealingly engage with an airbag (not shown). When the second tube 108 is engaged with the airbag, the second end wall 162 is disposed within the airbag and the first outlet 176 and the second outlet 178 are in fluid communication with an interior defined by the airbag (not shown). The diffuser 100 may be oriented relative to the airbag to strategically direct the flow of gas exiting the second tube 108 via the first outlet 176 and second outlet 178 toward specific regions of the interior of the airbag (not shown).

From the foregoing, it will be appreciated that the above first example diffuser 100 filters and directs a flow of gas from an airbag reaction canister. Thus, the diffuser 100 may aid in inflating the airbag more quickly and evenly. Further, the diffuser 100 may prevent particulate matter from entering a cockpit of a vehicle. Additionally, because the second tube 108 fits tightly into and is positionally fixed relative to the first tube 104, the diffuser 100 does not need a secondary weld as compared to existing diffusers. Thus, the first example diffuser 100 may provide a cost, material, and/or energy savings as compared to existing diffusers.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A diffuser, comprising:
a first tube including a first flat portion and a second flat portion opposite the first flat portion, the first flat portion defining a first opening and a receiver portion extending outwardly from the second flat portion and opposite the first opening, the receiver portion including a key;
a second tube inserted through the first opening and at least partially received by the receiver portion, the second tube perpendicular to the first tube, the second tube defining a notch, the key being inserted into the notch,
wherein the first tube defines a first cavity, the second tube defines a second cavity, and the second tube defines a plurality of perforations,
wherein the plurality of perforations provides fluid communication between the first cavity and the second cavity, and
wherein the plurality of perforations is sized to filter the flow of gas.

2. The diffuser of claim 1, wherein the second tube defines an outlet in fluid communication with the second cavity.

3. The diffuser of claim 2, wherein the outlet is aligned with the first tube.

4. The diffuser of claim 1, wherein the receiver portion is connected to the key.

5. The diffuser of claim 1, wherein the first tube has a bevel and the bevel defines the first opening.

6. The diffuser of claim 5, wherein the second tube defines a groove configured to snapably receive the bevel.

7. The diffuser of claim 5, wherein the second tube is press fit against the bevel.

8. The diffuser of claim 1, wherein the second tube has a transition region between a first cylindrical portion and a second cylindrical portion.

9. The diffuser of claim 8, wherein the transition region is partially conical.

10. A diffuser, comprising:
a first tube including an opening on a first side thereof and a second side thereof opposite the opening, the first tube defining a receiver portion including a key or a notch;
a second tube inserted through the first opening, at least a portion thereof received by the receiver portion such that the second tube is perpendicular to the first tube, the second tube defining a notch or a key, the key or notch of the receiver portion cooperating with the notch or key of the second tube,
wherein the first tube defines a first cavity, the second tube defines a second cavity, and the second tube defines a plurality of perforations,
wherein the plurality of perforations provides fluid communication between the first cavity and the second cavity, and
wherein the plurality of perforations is sized to filter the flow of gas.

11. The diffuser of claim 10, wherein the second tube defines an outlet in fluid communication with the second cavity.

12. The diffuser of claim 11, wherein the outlet is aligned with the first tube.

13. The diffuser of claim 10, wherein the first tube has a bevel and the bevel defines the first opening.

14. The diffuser of claim 10, wherein the second tube has a transition region between a first cylindrical portion and a second cylindrical portion.

* * * * *